United States Patent [19]

Hoy et al.

[11] 4,268,635

[45] May 19, 1981

[54] AROMATIC POLYMERS

[75] Inventors: Leslie R. J. Hoy, St. Neots; John B. Rose, Letchworth, both of England

[73] Assignee: Imperial Chemical Industries Limited, London, England

[21] Appl. No.: 714,327

[22] Filed: Aug. 13, 1976

[30] Foreign Application Priority Data

Aug. 20, 1975 [GB] United Kingdom ............... 34590/75

[51] Int. Cl.³ .............................................. C08G 65/38
[52] U.S. Cl. ........................................ 525/68; 525/534; 525/905
[58] Field of Search ................ 260/823, 49; 525/68, 525/534, 905

[56] References Cited

U.S. PATENT DOCUMENTS

| | | | |
|---|---|---|---|
| 3,441,538 | 4/1969 | Marks | 260/49 |
| 3,634,355 | 1/1972 | Barr et al. | 260/49 |
| 3,764,583 | 10/1973 | Newton et al. | 260/823 |
| 3,928,295 | 12/1975 | Rose | 260/49 |
| 4,008,203 | 2/1977 | Jones | 260/49 |
| 4,010,147 | 3/1977 | Rose | 260/49 |
| 4,036,815 | 7/1977 | Feasey et al. | 260/49 |

FOREIGN PATENT DOCUMENTS 1078234 8/1967 United Kingdom .
1153527 5/1969 United Kingdom .

*Primary Examiner*—Hosea E. Taylor
*Assistant Examiner*—Amelia B. Yarbraugh
*Attorney, Agent, or Firm*—Cushman, Darby & Cushman

[57] ABSTRACT

Block copolymers are prepared by heating at above 250° C. (i) a halophenate, (ii) dihalobenzenoid compound plus bisphenate, and/or (iii) a polymer formed from (i) or (ii) having at least one phenate end group, said halophenate and/or dihalobenzenoid compound containing $SO_2$ groups ortho or para to the halogen atoms, in the presence of a suspension of a crystalline polyetherketone or etherketone/sulphone copolymer.

10 Claims, No Drawings

AROMATIC POLYMERS

This invention relates to aromatic polymers and in particular to aromatic polyethers containing ketone and sulphone groups.

Aromatic polyethersulphones, such as those containing the repeating units

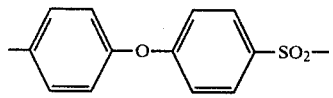

are materials having good mechanical properties at elevated temperatures. The homopolymer having the repeat unit I is amorphous and has a glass/rubber transition temperature (Tg) of about 230° C. However, for many applications a crystalline material is desirable, e.g. where the polymer is liable to be exposed to the action of solvents at elevated temperatures and a good solvent resistance is required.

Aromatic polyetherketones, such as those containing the repeating units

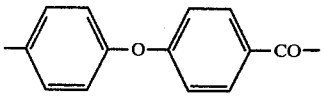

are crystalline materials having a high crystalline melting point (Tm). They are rather difficult to process and are relatively expensive.

Polymers containing both units I and II have previously been described. Thus in Example 9 of British Pat. No. 1,078,234 the preparation of the regular alternating copolymer having repeat units

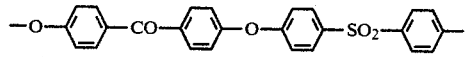

is described. This polymer is almost certainly amorphous and was said to have a Tg of 205° C. British Pat. Nos. 1,016,245 and 1,153,527 disclose some crystalline copolymers of units I and II having ethersulphone unit I contents of about 50 to about 60 mole % but those crystalline copolymers were of only relatively low molecular weight. Random copolymers of units I and II of high molecular weight (i.e. reduced viscosity of at least 0.8 is measured at 25° C. on a solution of the polymer in concentrated sulphuric acid of density 1.84 g.cm$^{-3}$ containing 1 g of polymer in 100 cm$^3$ of solution) containing more than about 40 mole % of ethersulphone units I are amorphous, while those containing lesser amounts of units I tend to be increasingly crystalline as the proportion of units I decreases.

British Pat. No. 1,414,421 describes a process for the production of high-molecular-weight polyetherketones, and copolymers containing ethersulphone units, by heating a bisphenate such as

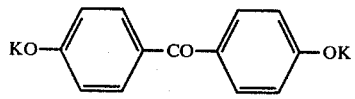

with a dihalogen compound such as

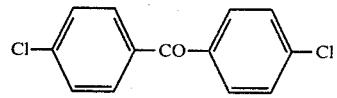

at 250° C. to 400° C. in the presence of a specified class of solvent, e.g. diphenyl sulphone. (To make sulphone-containing copolymers, some of the monomeric material, e.g. the dihalo compound, is replaced by a sulphone-containing compound such as 4,4'-dichloro diphenyl sulphone

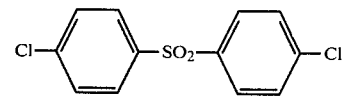

so that up to 25 mole % of the —CO— groups in the monomeric material are replaced by —SO$_2$— groups.)

Copolymers containing units I and II made by that process are random copolymers.

However we have found that even these crystalline high-molecular-weight random copolymers show a marked deterioration in mechanical properties above a certain temperature (which depends on the composition of the copolymer). Thus it is thought that this deterioration in mechanical properties occurs when the temperature is above the Tg of the non-crystalline portion, i.e. the amorphous portion, of the polymer. Thus a high-molecular-weight random copolymer containing 10 mole % of ethersulphone units I and 90 mole % of etherketone units II exhibits a sharp reduction in modulus at about 150° C.

We have now found that certain polymers containing ethersulphone units I and etherketone units II, which we believe to contain block copolymers, are crystalline and exhibit improved high-temperature properties compared with random copolymers of similar composition. Further we have found that copolymers may be made that are crystalline at proportions of etherketone units II as low as 30 mole % (at which proportion random copolymers are amorphous).

According to the present invention we provide a process for the manufacture of a copolymer whose molecular chains contain phenylene, ketone, and sulphone groups and oxygen atoms comprising heating (i) at least one alkali metal halophenate containing a sulphone group ortho or para to the halogen atom, and/or (ii) a mixture of a dihalobenzenoid compound containing a sulphone group ortho or para to each halogen atom and a substantially equivalent amount of an alkali metal hydroxide or carbonate and/or (iii) a mixture of substantially equimolar proportions of at least one dihalobenzenoid compound containing a sulphone group ortho or para to each halogen atom, and at least one alkali metal bisphenate, and/or (iv) a polyethersulphone formed from (i) and/or (ii) and/or (iii) whose molecular chains have at least one phenate end group, dissolved in a dipolar aprotic liquid, in the presence of a polyetherketone or crystalline etherketone/sulphone copolymer suspended in finely divided particulate form in said dipolar aprotic liquid.

We also provide crystalline copolymers in which 30 to 60, particularly 40 to 55, mole % of the repeat units have the formula

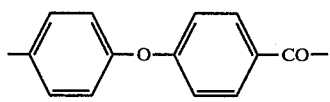

and, correspondingly, 70 to 40, particularly 60 to 45, mole % of the repeat units have the formula

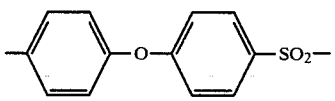

up to 50 mole % of the

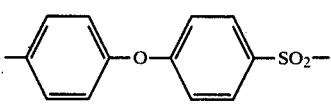

units being replaced by

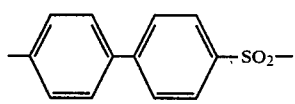

units, said copolymers having a reduced viscosity of at least 0.8 (as measured at 25° C. on a solution of the polymer in concentrated sulphuric acid of density 1.84 g.cm$^{-3}$ containing 1 g of polymer in 100 cm$^3$ of solution).

In the process of the present invention it is thought that the polyethersulphone, which may be formed in situ by the polymerisation of the halophenate and/or mixture of dihalobenzenoid compound and bisphenate, having phenate end-groups, grafts on to the polyetherketone (or etherketone/sulphone copolymer) to form a true block copolymer. If, as is preferred, the polyetherketone (or etherketone/sulphone copolymer) has halogen end-groups ortho or para to a ketone or sulphone group, the grafting reaction probably involves such end-groups. It is however also possible to graft onto the polymer via attack at its ether linkages.

Since polyetherketones are liable to attack by nucleophiles at elevated temperatures it is important that such attack by phenate groups is not permitted to occur too readily as otherwise formation of a random copolymer may ensue. In the process of the present invention, such attack is minimised by the fact that the polyetherketone is in finely divided particulate form as opposed to a solution.

It will be appreciated that if the polyetherketone is appreciably soluble in the dipolar aprotic liquid at above a certain temperature, that temperature limits the reaction temperature than can be used with that solvent.

The amount of reaction between the polyetherketone and the phenate end-groups of the polyethersulphone increases with increasing temperature. At temperatures below about 250° C. the reaction only occurs very slowly and, unless very long reaction times are employed, the product is generally a blend of the polyethersulphone and the polyetherketone.

Thus the temperature is preferably as high as is possible without an undue amount of the polyetherketone dissolving. The precise maximum temperature will of course depend on the nature of the solvent and of the polyetherketone. The reaction is preferably effected at a temperature between 250° C. and 300° C.

Preferred dipolar aprotic liquids in which the polyetherketones have only a limited solubility at 250° to 300° C. (and hence are generally suitable for use at those temperatures) are those of the formula

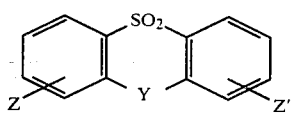

in which Y is a direct link, an oxygen atom or two hydrogen atoms (one attached to each benzene ring) and Z and Z' are hydrogen atoms or phenyl groups and may be the same or different. Diphenyl sulphone (where Z, Z' and Y are all hydrogen) is the preferred solvent.

In order to reduce the possibility of cleavage of the ether linkages in the polyetherketone, the concentration of phenate is preferably kept as low as possible. For this reason we prefer to use a preformed polyethersulphone rather than make it in situ, although it will be appreciated that the polyethersulphone may be made in situ at a lower temperature and then the temperature increased to permit reaction of the phenate end-groups of the polyethersulphone with the polyetherketone (e.g. with halogen end-groups thereof) so as to cause linkage of the etherketone blocks with the ethersulphone blocks.

The polyetherketone is conveniently made by the process of aforesaid British Pat. No. 1,414,421. The polyetherketone can be made with halogen end-groups by using a slight excess of dihalo compound as is preferred in the process of that British patent specification.

The polyetherketone (which may be a random etherketone/sulphone copolymer in which up to 30% of the ketone and sulphone linkages are sulphone linkages) preferably contains the repeat units

where the units A, which may vary from unit to unit, are selected from divalent radicals of the formula

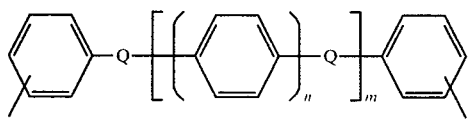

and

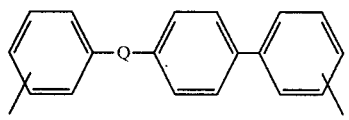

where at least 95% of the linking valencies are in the para position, n is 1, 2 or 3 and m is 0, 1, 2 or 3, and the units B, which may vary from unit to unit, are selected from divalent radicals of the formula

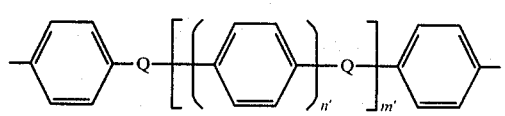

where n' is 1, 2 or 3 and m' is 0, 1, 2 or 3, the groups Q are selected from —SO$_2$— and —CO—, not more than 30% of said groups Q being —SO$_2$— groups.

The preferred polymers have the structure

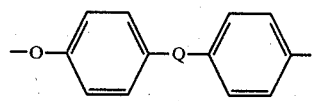

i.e. A and B are both

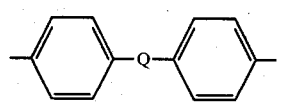

(i.e. where m and m' are both zero) where up to 30% of the groups Q are —SO$_2$— groups.

Polymers containing biphenylylene and/or terphenylylene groups, i.e. where n and/or n' are 2 or 3 and m and/or m'=1, 2 or 3 may be used where a polymer having a higher crystalline melting point is desired.

The polyetherketone employed in the process preferably has a reduced viscosity (as measured at 25° C. on a solution of polymer in concentrated sulphuric acid of density 1.84 g.cm$^{-3}$ containing 1 g of polymer in 100 cm$^3$ of solution) of 0.8 to 1.2. The lower the reduced viscosity, the greater will be the proportion that will be crystalline.

The polyethersulphone preferably has the structure

—D—O—E—O— where D is the radical obtainable by removal of the halogen atoms from a dihalobenzenoid compound containing —SO$_2$— groups ortho or para (preferably the latter) to the halogen atoms, and E is the radical obtainable by removal of the hydroxy groups from a bisphenol. [Where a halophenate, or dihalobenzenoid compound plus alkali metal hydroxide or carbonate, is employed, D and E will be the same.]

The polyethersulphone preferably contains the repeat units

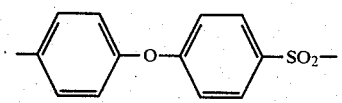

alone or in conjunction with units such as

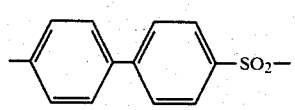

or

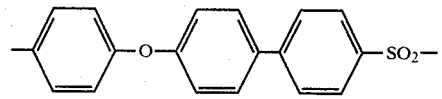

The inclusion of biphenylylene units increases the Tg of the polyethersulphone and so block copolymers made from polyetherketones and polyethersulphones containing biphenylylene units have improved high-temperature properties compared with block copolymers made from polyethersulphones containing only

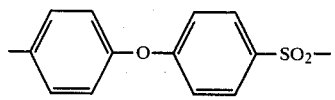

units.

The polyethersulphone may be prepared from a dihalobenzenoid compound in which each halogen atom is ortho or para, preferably the latter, to a sulphone group, by reaction with a substantially equivalent amount of an alkali metal hydroxide—for example as described in British Pat. Nos. 1,153,035 or 1,153,528. In such a process the dihalo compound is preferably a bis(4-halophenyl) sulphone and/or a 4,4'-bis(4-halophenylsulphonyl) biphenyl.

The polyethersulphone may also be made by heating an alkali metal halophenate having a sulphone group ortho or para to the halogen atom, for example as described in British Pat. Nos. 1,153,035, 1,177,183, 1,234,301, 1,265,144, 1,296,383, 1,298,821 and 1,303,252. Preferred halophenates include 4(4-halophenylsulphonyl) phenates and the alkali metal salts of 4(4-halophenylsulphonyl)-4'-hydroxy biphenyls (the latter compounds are described in British Pat. No. 1,298,822). In some cases the halophenate may be made in situ by hydrolysis of one halogen atom of a dihalobenzenoid compound having a sulphone group ortho or para, preferably the latter, to each halogen atom with an alkali metal hydroxide for example as described in British Pat. No. 1,153,035 or by reacting a halophenol with an alkali metal hydroxide, or carbonate for example as described in Canadian Pat. No. 847,963.

An alternative way of making the polyethersulphone is by reaction of an alkali metal bisphenate with a substantially equimolar amount of a dihalobenzenoid compound containing a sulphone group ortho or para, preferably the latter, to each halogen atom, for example as described in British Pat. Nos. 1,078,234, 1,133,561, 1,264,900, 1,294,982, and Canadian Pat. No. 847,963. As described in British Pat. Nos. 1,078,234, 1,264,900 and Canadian Pat. No. 847,963 the bisphenate may be made in situ by reaction of a bisphenol with an alkali metal hydroxide or carbonate. Preferred dihalo compounds include bis(4-halophenyl) sulphones and 4,4'-bis(4-halophenylsulphonyl) biphenyls, while preferred bisphenols include 4,4'-dihydroxybiphenyl and bis(4-hydroxyphenyl) sulphone.

In order for the polyethersulphone to be able to link to the polyetherketone it is necessary that the polyethersulphone has at least one phenate end-group (or that the monomer material employed to make the polyethersulphone is such that the polyethersulphone will have at least one phenate end group). This may be ensured by utilising precisely equivalent proportions of bisphenate and dihalo compound (or bisphenol, base, e.g. alkali metal hydroxide, and dihalo compound) or a slight excess of bisphenate (or bisphenol plus base). Where the polyethersulphone is made from a halophenol, an equivalent or slight excess of base, e.g. alkali metal hydroxide, is employed. Alternatively when utilising a halophenol plus base, halophenate, or dihalo compound plus base, a small amount of an alkali metal bisphenate (which may be made in situ from bisphenol plus base) may be additionally incorporated to ensure that the polyethersulphone has phenate end-groups.

As explained previously, in order to avoid ether cleavage of the polyetherketone, the concentration of phenate groups is preferably kept as small as possible and for that reason the polyethersulphone is preferably made separately. Thus a preferred process comprises heating at above 250° C. a reaction mixture comprising a polyethersulphone whose molecular chains have at least one phenate end-group dissolved in a dipolar aprotic liquid having a polyetherketone or etherketone/sulphone copolymer suspended therein in finely divided form. Preferably the molecular chains of the latter polymer have halogen end-groups ortho or para to a ketone or sulphone group.

The polyethersulphone preferably has a relatively low molecular weight, preferably corresponding to a reduced viscosity (as measured at 25° C. on a solution of polymer in dimethyl formamide containing 1 g of polymer in 100 cm$^3$ of solution) of less than 0.2. During the process of the invention using a preformed polyethersulphone, (where not all of its end-groups are phenate groups) some further polymerization of the polyethersulphone may occur.

The amounts of polyetherketone (or crystalline etherketone/sulphone copolymer) and polyethersulphone (or the reactants from which the latter is formed) to be used will, of course, depend on the desired constitution of the resultant polymer product. Preferably they are present in the reaction mixture in the proportions of 20 to 90% by weight of the polyetherketone or etherketone/sulphone copolymer and correspondingly 80 to 10% by weight of the polyethersulphone (or such proportions of reactants, where the polyethersulphone is made in situ, to give this proportion of polyethersulphone).

Generally not all of the polyethersulphone becomes chemically bonded to the etherketone polymer and so the product of the reaction is believed to consist of a mixture of the block copolymer, polyethersulphone and, possibly, some unmodified etherketone polymer. The product may be used as such or, if desired, the polyethersulphone may be extracted therefrom by means of a solvent extraction technique using a solvent such as dimethyl formamide.

The invention is illustrated by the following Examples.

In these Examples reduced viscosity is measured at 25° C. on a solution of the polymer in a specified solvent containing 1 g of polymer in 100 cm$^3$ of solution. In some cases the solvent is dimethyl formamide (DMF) while in others it is concentrated sulphuric acid (H$_2$SO$_4$) of density 1.84 g.cm$^{-3}$.

The absorbance measurements quoted are made at a wavelength of 550 nm in a 10 mm cell using a solution of the polymer in concentrated sulphuric acid of density 1.84 g.cm$^{-3}$ containing 1 g of polymer in 100 cm$^3$ of solution. The absorbance of the polymer is preferably less than 0.3.

EXAMPLE 1

A low molecular weight polyethersulphone (86.55 g; 0.3731 moles repeat unit) of repeat unit

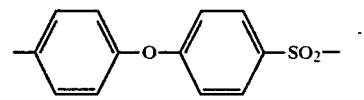

with approximately equal numbers of chlorine and phenate end-groups made by polymerisation of potassium 4(4-chlorophenylsulphonyl) phenate to a degree of polymerisation of about 20 (which corresponds to a reduced viscosity in DMF of about 0.2) dissolved in diphenyl sulphone (129.85 g) was charged to a 500 ml flask. A random etherketone/sulphone copolymer (74.47 g; 0.3731 moles repeat unit) containing 90 mole % of repeat units

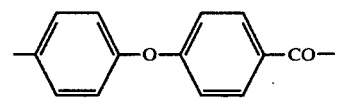

and 10 mole % of repeat units

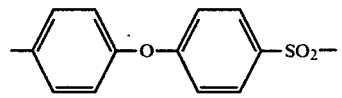

and having only chlorine end-groups and a degree of polymerisation of about 45 (corresponding to a reduced viscosity in H$_2$SO$_4$ of about 0.9), was made by the process described in British Pat. No. 1,414,421 from the dipotassium salt of 4,4'-dihydroxybenzophenone and a mixture of bis(4-chlorophenyl) sulphone and 4,4'-dichlorobenzophenone was also charged to the flask in finely divided form together with a further quantity of diphenyl sulphone (112 g). The flask was purged with nitrogen and heated on a bath of molten metal at 260° C. for 7¼ hours. Initially a mobile yellow slurry was formed. This thickened over the 7¼ hours and became much paler but always remained as two phases.

The reaction mixture was cooled under nitrogen and the resultant solid was ground and worked up with successive methanol and water washes. The polymer was dried under vacuum at 120° C.

The yield of polymer was 140 g and it had a reduced viscosity in H$_2$SO$_4$ of 0.98 and an absorbance of 0.11. From the proportions of reactants employed, the polymer nominally contained 45 mole % of

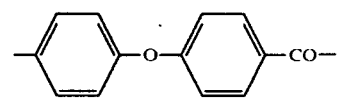

units and 55 mole % of

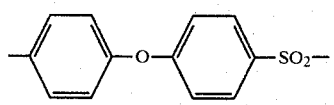

units.

[A random copolymer of this composition would be amorphous with a glass/rubber transition temperature, Tg, of 193° C.]

A sample of the polymer was made into film by pressing the polymer for 3 minutes at a temperature of 400° C. in a press exerting a force of about 200 kN followed by slow cooling. The film was tough and opaque, indicating that it was crystalline. Differential scanning calorimetry showed that the polymer had a crystalline melting point, Tm, of 339° C. and a glass/rubber transition temperature, Tg, of 176° C.

[The random etherketone/sulphone copolymer employed in the reaction had a Tm of 340° C. and a Tg of about 150° C.]

A sample (60 g) of the polymer was slurried three times at 90° C. with dimethyl formamide (500 ml samples) to dissolve any DMF-soluble material, i.e. polyethersulphone which had not been chemically bound to the random copolymer and any low molecular weight copolymer present. The residue was carefully washed with boiling water (3 times) and methanol (once) and dried under vacuum. The residue had a Tm of 340° C., a reduced viscosity in $H_2SO_4$ of 1.50 and an absorbance of 0.2. Elemental analysis of the residue polymer revealed that it had a sulphur content of 4.1% by weight—which corresponds to about 24 mole % of

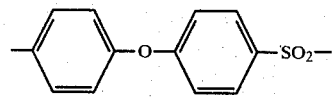

units, and, correspondingly, about 76 mole % of

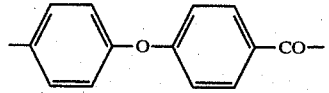

units.

[A random copolymer containing 24 mole % of

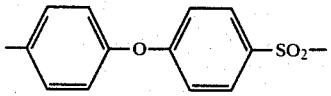

units would have a Tm of about 310° C.]

39.4% by weight of another sample of the polymer prepared by the above process was dissolved after extracting the polymer for 48 hours with methylene chloride, indicating that about 26.7 wt % of the polyethersulphone had combined with the etherketone/sulphone copolymer.

When Example 1 was repeated using a reaction temperature of 300° C., the resulting polymer which had a reduced viscosity in $H_2SO_4$ of 1.17 was amorphous and gave clear tough films on pressing. No crystalline melting point was evident. It is believed that this was a random copolymer, randomisation occurring because of the use of too high a reaction temperature. Extraction with methylene chloride revealed that essentially all the polyethersulphone had combined with the etherketone/sulphone copolymer.

EXAMPLE 2

The procedure of Example 1 was repeated using a reaction time of 7 hours and a reaction temperature of 280° C. with 41.428 g (0.1786 moles repeat unit) of the polyethersulphone, a total of 84.7 g of diphenyl sulphone, and 15 g (0.0765 mole repeat unit) of a polyetherketone homopolymer of repeat unit

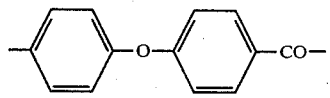

made by the procedure of British Pat. No. 1,414,421, having only chlorine end-groups, a reduced viscosity in $H_2SO_4$ of 1.03 (corresponding to a degree of polymerisation of about 50) and an absorbance of 0.21.

The resulting copolymer, which from the proportions of reactants employed nominally contained 70 mole % of

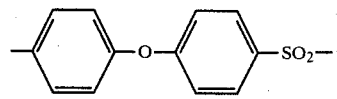

units, had a reduced viscosity in $H_2SO_4$ of 1.09 and an absorbance of 0.10. It gave tough opaque films on pressing, and had a Tm of 354° C. and a Tg of 207° C. 36.8% by weight of the polymer was dissolved upon extraction with methylene chloride showing that about 50% by weight of the polyethersulphone had combined with the polyetherketone. By calculation, the block copolymer, i.e. the residue (which had a reduced viscosity in $H_2SO_4$ of 1.52) from the extraction contains about 53 mole % of polyethersulphone units and, correspondingly 47 mole % polyetherketone units.

EXAMPLE 3

The procedure of Example 1 was repeated using 20 g (0.1002 mole repeat units) of the etherketone/sulphone copolymer, a total of 64.4 g of diphenyl sulphone and 22.93 g (0.1002 mole repeat units) of a polyethersulphone of reduced viscosity in DMF of about 0.2, having equal numbers of phenate and chlorine end-groups, and containing 80 mole % of repeat units

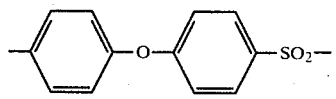

and 20 mole % of repeat units

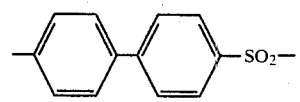

made by the procedure of Example 2 of British Pat. No. 1,153,528.

The resultant polymer, which from the proportions of reactants employed had a nominal composition of 45 mole % of

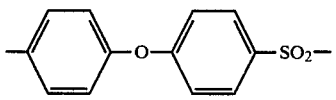

units, 10 mole % of

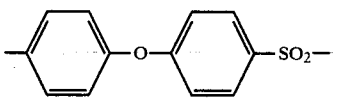

units, and 45 mole % of

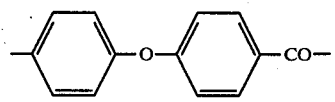

units, had a reduced viscosity in $H_2SO_4$ of 0.93, an absorbance of 0.1 and gave tough opaque films on pressing. The polymer had a Tm of 341° C. and a Tg of 212° C.

29.3% by weight of the polymer was dissolved upon extraction with methylene chloride, indicating that 45% by weight of the polyethersulphone had combined with the etherketone/sulphone copolymer.

EXAMPLE 4

Example 1 was repeated using 23.6 g (0.102 mole repeat unit) of the polyethersulphone, 20 g (0.1002 mole repeat unit) of the random etherketone/sulphone copolymer and a total of 55.6 g of diphenyl sulphone, at a reaction temperature of 230° C. The time taken to obtain a very viscous reaction mixture was 27½ hours.

The resulting polymer, which from the proportions of reactants used had a nominal composition of 55.4 mole % of

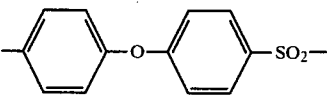

units and 44.6 mole %

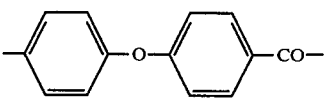

units, had a reduced viscosity in $H_2SO_4$ of 1.32 and an absorbance of 0.09. Film pressed from the polymer was tough and opaque.

36.7% by weight of the polymer dissolved upon extraction with methylchloride, indicating that about 68% by weight of the polyethersulphone had combined with the random copolymer.

We claim:

1. A process for the manufacture of a copolymer whose molecular chains contain phenylene, ketone, and sulphone groups and oxygen atoms comprising heating at a temperature between 250° C. and 300° C., at least one of the reactants selected from
    (i) at least one alkali metal halophenate containing a sulphone group ortho or para to the halogen atom,
    (ii) a mixture of a dihalobenzenoid compound containing a sulphone group ortho or para to each halogen atom and a substantially equivalent amount of an alkali metal hydroxide or carbonate,
    (iii) a mixture of substantially equimolar proportions of at least one dihalobenzenoid compound containing a sulphone group ortho or para to each halogen atom, and at least one alkali metal bisphenate, and
    (iv) a polyethersulphone formed from at least one of the reactants (i), (ii) and (iii) above whose molecular chains have at least one phenate end group, dissolved in a dipolar aprotic liquid, in the presence of a preformed polyetherketone or crystalline etherketone/sulphone copolymer suspended in finely divided particulate form in said dipolar aprotic liquid whereby the product obtained by said heating grafts onto said preformed particulate polymer, the polyetherketone or etherketone/sulphone copolymer and the polyethersulphone or the reactants from which the latter is formed being present in the reaction mixture in the proportions of 20 to 90% by weight of the polyetherketone or etherketone/sulphone copolymer and correspondingly 80 to 10% by weight of the polyethersulphone or such proportions of reactants, where the polyethersulphone is made in situ, to give this proportion of polyethersulphone, the dipolar aprotic liquid being a sulphone of the formula

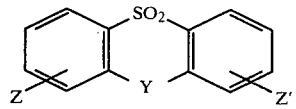

in which Y is a direct link, an oxygen atom or two hydrogen atoms (one attached to each benzene ring) and Z and Z' are hydrogen atoms or phenyl groups and may be the same or different.

2. A process according to claim 1 wherein the polyetherketone or etherketone/sulphone copolymer has halogen end groups ortho or para to a ketone or sulphone group.

3. A process according to claim 1 wherein the polyetherketone or etherketone/sulphone copolymer has the repeat units

where the units A, which may vary from unit to unit, are selected from divalent radicals of the formula

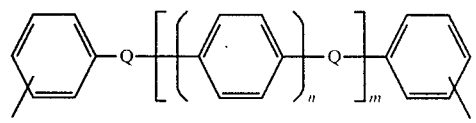

and

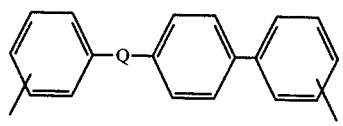

where at least 95% of the linking valencies are in the para position, n is 1, 2 or 3, and m is 0, 1, 2 or 3, and the units B, which may vary from unit to unit, are selected from divalent radicals of the formula

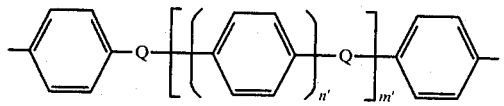

where n' is 1, 2 or 3 and m' is 0, 1, 2 or 3, the groups Q are selected from $-SO_2-$ and $-CO-$, not more than 30% of said groups Q being $-SO_2-$ groups.

4. A process according to claim 3 in which the polyetherketone or etherketone/sulphone copolymer has the repeat unit

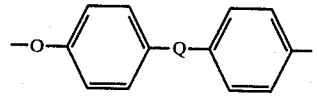

where up to 30% of the groups Q are $-SO_2-$ groups.

5. A process according to claim 1 in which the polyetherketone or etherketone/sulphone copolymer has a reduced viscosity (as measured at 25° C. on a solution of polymer in concentrated sulphuric acid of density 1.84 g.cm$^{-3}$ containing 1 g of polymer in 100 cm$^3$ of solution) of 0.8 to 1.2.

6. A process according to claim 1 comprising heating a reaction mixture comprising a polyethersulphone whose molecular chains have at least one phenate end group dissolved in a dipolar aprotic liquid having a polyetherketone or etherketone/sulphone copolymer suspended therein in finely divided form.

7. A process according to claim 6 in which the polyethersulphone has repeating units of the structure $$-D-O-E-O-$$

where D is the radical obtainable by removal of the halogen atoms from a dihalobenzenoid compound containing $-SO_2-$ groups ortho or para to the halogen atoms, and E is the radical obtainable by removal of the hydroxy groups from a bisphenol.

8. A process according to claim 7 in which the polyethersulphone contains the repeat units

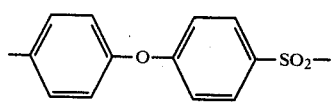

alone or in conjunction with units selected from

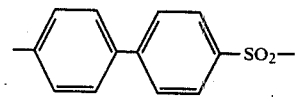

and

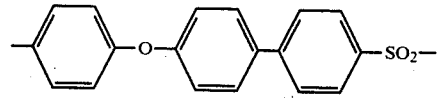

9. A process according to claim 6 in which the polyethersulphone has a reduced viscosity (as measured at 25° C. on a solution of polymer in dimethyl formamide containing 1 g of polymer in 100 cm$^3$ of solution) of less than 0.2.

10. A process according to claim 1 in which, after effecting the heating, uncombined polyethersulphone is solvent extracted from the copolymer.

* * * * *